April 1, 1952  H. O. HALVORSON  2,590,964
PROCESS OF TREATING SEWAGE
Filed Sept. 26, 1947  2 SHEETS—SHEET 2

INVENTOR
H. ORIN HALVORSON
By Paul, Paul Moore & Gies
ATTORNEYS

UNITED STATES PATENT OFFICE 2,590,964

PROCESS OF TREATING SEWAGE

H. Orin Halvorson, St. Paul, Minn.

Application September 26, 1947, Serial No. 776,195

11 Claims. (Cl. 210—7)

This invention relates to a process of treating sewage and it is a general object of the invention to provide such a process which is efficient and economical in operation, and can be carried out in plants of inexpensive construction.

Among the broad objects of the invention is the provision of a process of treating organic sewage to purify the same which does not include a preliminary settling treatment of the incoming raw sewage to remove the settleable solids contained therein.

Again it is a broad object of the invention to provide an improved sewage treating process wherein there is no anaerobic treatment whereby objectionable odors accompanying such treatment are eliminated.

Also, it is an object to provide an improved process of stabilizing sewage without digestion.

More particularly it is an object of the invention to provide an aerobic treatment of the sewage which does not require either primary settling, or digestion of sludge.

Again it is an object of the invention to provide an improved sewage treatment process which avoids unnecessary discharge of nitrogen compounds with the final effluent.

Furthermore, it is an object of the invention to provide an efficient non-odorous sewage disposal process requiring a minimum of plant space so that plants for carrying out the same may be built in or adjacent to residential districts.

These and numerous other objects of the invention will become more readily apparent upon a detailed study of the accompanying specification and drawings together with the appended claims.

Referring now more particularly to the drawings, numeral 2 designates generally a trickling filter open to atmosphere which may be of any suitable type but preferably the composite filter is of the Page type in which the filter is provided with a plurality of substantially vertical conduits having substantially smooth continuous walls extending therethrough from the top of the bottom thereof and providing passageways down the walls of which the sewage being treated flows.

Figure 4:
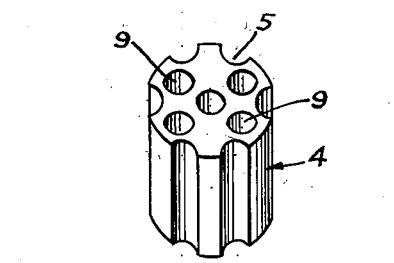
Fig. 4 is a perspective view of one of the filter units.

As here shown, the composite filter is formed from a plurality of units of the type shown in Figure 4 and designated by the reference numeral 4. This unit comprises a cylindrical body having its periphery provided with longitudinally extending flutes or grooves 5 and with a plurality of longitudinally extending holes 9 having substantially smooth and continuous walls. Such filter unit is preferably formed of vitrified clay which will not adversely affect the growth of bacteria within the filter and which will not be disintegrated within the filter.

Figure 1:
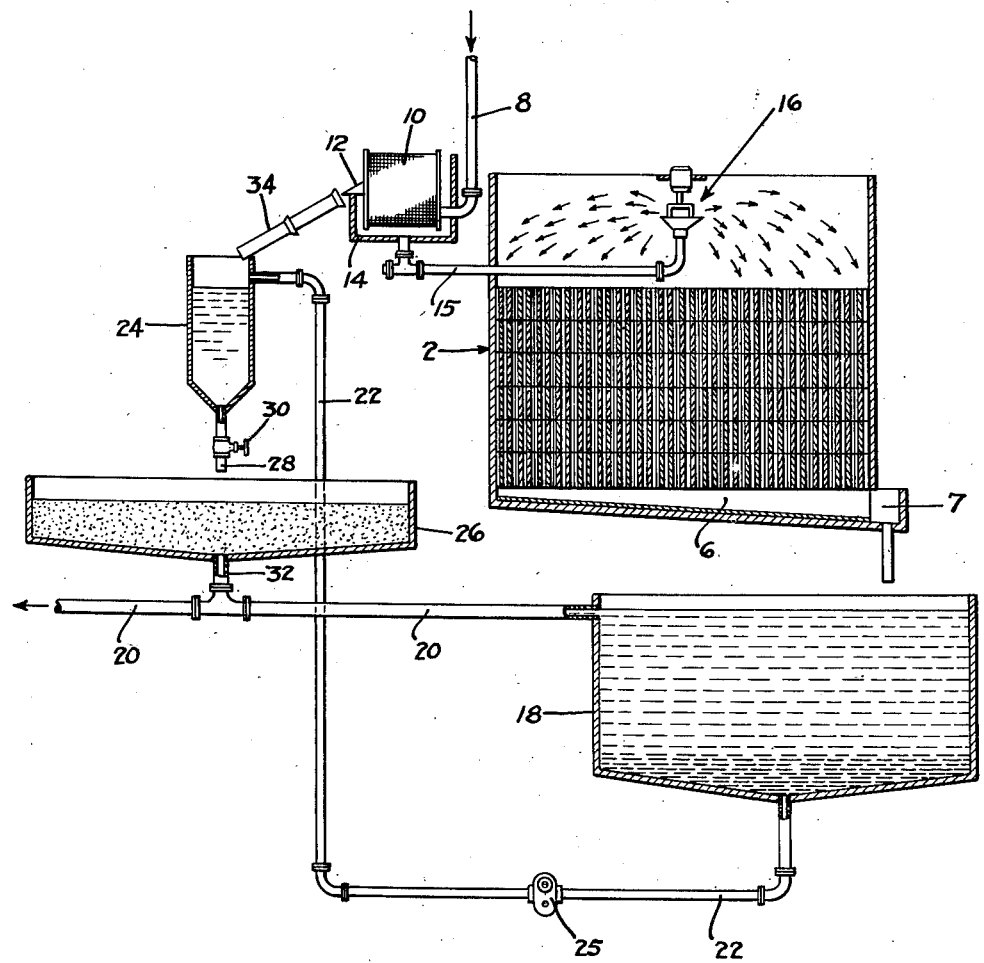
Fig. 1 is a view partly in cross-section showing an illustrative form of assembled apparatus for treating sewage in accordance with the present invention.
Figure 5:
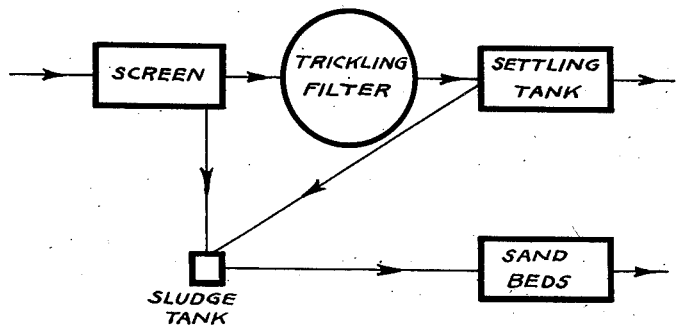
Fig. 5 is a flow diagram of a process carried out in the plant shown in Fig. 1, in accordance with the present invention.
Figures 2, 3:
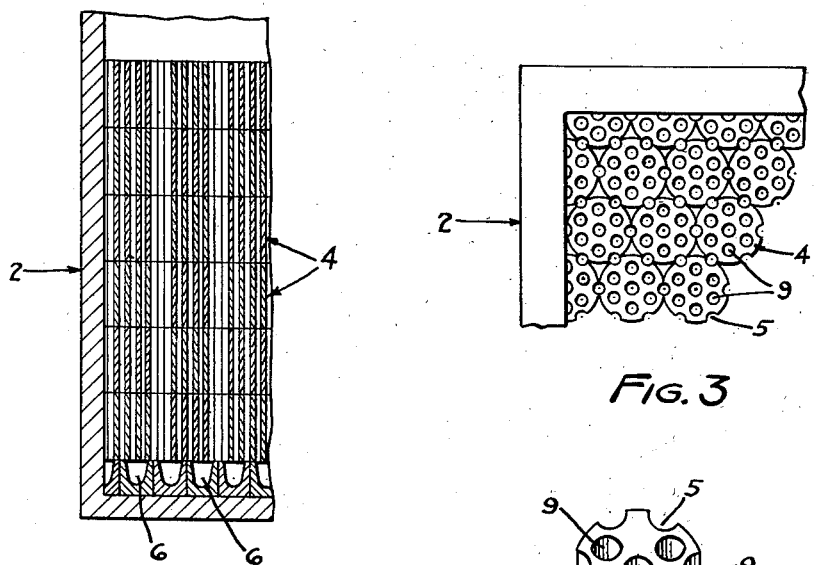
Fig. 2 is a partial cross-sectional view of the filter.
Fig. 3 is a partial plan view of the filter.

The filter units 4 are preferably arranged closely adjacent one another in layers which are in turn superposed one above the other in predetermined arrangement with the holes of superposed units in vertical alignment, to form the composite filter 2 having substantially vertical conduits provided with substantially smooth continuous walls extending therethrough from the top to the bottom thereof as clearly shown in Figs. 1 and 2. Preferably these passageways have a diameter of one inch or more. It will be understood that the units 4 may be formed of any suitable material other than vitrified clay, such as glass or other ceramics, for example. Also the units may be of various shapes and sizes in accordance with individual preference of design. The units and their arrangement in the composite filter are such that preferably more than twenty square feet of bacterial contact surface are provided per cubic foot of composite filter, it being noted that the use of a filter having thirty-five square feet of contact surface per cubic foot has been found to be desirable although it will be understood that filters having a greater proportion of contact surface may be employed.

As shown in Figs. 1 and 2, the fabricated tile filter media is supported on a suitable underdrain 6 which communicates with the atmosphere to enable a natural draft of air through the filter and it may, if desired, also communicate with a fan or blower for mechanically forcing a draft of air through the filter, although in most instances this will be unnecessary because of the unobstructed passage to flow of air offered by the vertical conduits formed in the composite filter. A Page type filter as herein shown requires a markedly smaller temperature differential to create a natural draft than in the case of an ordinary rock filter, and ordinarily does not require any forced draft when used in carrying out the present process. But if conditions of temperature of the liquid and atmosphere are such as to make forced draft desirable or necessary, it may be provided as above stated.

Because of the fact that the passages in the composite filter provide very little air resistance there are no definitely defined limits for the depth of the filter and it may be varied considerably depending upon the strength of the sewage being purified. Preferably, however, the filter is maintained at the standard depth of from six to eight feet and in the event the sewage being handled has a strength above the range of ordinary domestic sewage, the incoming raw sewage or primary influent may be diluted sufficiently to bring the filter influent to a strength within the range of values for ordinary domestic sewage, i. e. substantially from 100 B. O. D. to 700 B. O. D. (five day biochemical oxygen demand as used in standard practice). But if desired, the fabricated tile filter may, because of its low resistance to air flow, be increased in depth to take care of sewages of high strength. Again, sewage of high strength may be passed through a plurality of filters in stages.

Numeral 8 designates a conduit for delivering incoming unsettled raw sewage into the inside of a rotary, self-cleaning, cylindrical screen 10 of any desired type, for separating substantially only materials not readily disintegrated such as matches, rags, cinders, etc., while permitting the liquid and usual organic solids to pass therethrough. A device of this character of well-known type on the market employing a semicoarse screen and provided with an inner hopper and associated conveyor screw for receiving such materials when raised by vanes or slides within the screen and dropped, and for continuously discharging the same from the hopper outlet 12, has been found very satisfactory. A wide variety of screen sizes may be used. In this screening device, a screen of from four to sixty mesh may be employed, it being noted that the size of the mesh must be such that the screen will prevent passage of the materials above referred to but will not present undue clogging difficulties. In the range above mentioned, there is a tendency toward clogging when screens with the smaller sized mesh openings are used. Preferably screens of from four to sixteen mesh are employed and an actual operation of a plant with a screen of sixteen mesh over a relatively long period of time has shown that this size mesh will result in efficient operation substantially without clogging difficulties.

The liquid sewage and associated solids passing through the screen 10, drop into the screen chamber 14 and thence pass through conduit 15 to any suitable distributer device 16 which is preferably of such character as to lend itself for use in applying the sewage from conduit 15 to the top surface of the filter at a distribution ratio of less than 10 to 1, as set forth in Halvorson and Smith Patent No. 2,141,979. As pointed out in such patent the distribution ratio is the ratio of (a) what the daily average rate of application would be if sewage were applied to the entire surface of the filter at the mean maximum momentary rate of application continuously for 24 hours, to (b) what the daily average rate of application actually is. The distributer device is preferably continuously operating. It may be motor-driven or operated by the hydraulic head, and preferably operates to apply the sewage uniformly over the entire filter bed surface in the form of a mist or rain. Any suitable form of non-clogging distributer device for accomplishing this purpose may be employed as for example a distributer comprising a rotating disk having a plurality of spirally shaped vanes or blades of variable length for projecting the sewage outwardly and uniformly over the entire surface of the bed.

The sewage which is applied to the filter flows through the vertical passages therein and into the underdrain 6 to a collecting gutter 7 from which it is delivered to a settling tank 18 in which the solids settle at the bottom. Tank 18 is provided with a discharge opening communicating with a suitable discharge conduit 20 for leading away the purified liquid from which the solids have settled out.

A conduit generally designated at 22 leads from an opening in the bottom of settling tank 18 to the upper portion of sludge tank 24. Any suitable pumping means 25 are provided for pumping sludge from the bottom of settling tank 18 to sludge tank 24 when desired. Numeral 26 designates any suitable form of sand bed for receiving sludge which may be supplied directly to this sand bed from tank 24 through conduit 28 controlled by a suitable valve 30. If desired the sludge in tank 24 may be placed in a second tank before being placed in the sand pit, however. As shown in Figure 1, the sand bed drains into a conduit 32, communicating with the main final effluent discharge conduit 20. Or, if desired, the drainage from the sand bed may be conveyed to the raw sewage. Any suitable means may be provided for draining off excess liquid from the tank 24 after the solids have settled or compacted at the bottom.

In carrying out a process embodying the several features of the present invention with the apparatus herein described, incoming unsettled raw organic sewage, as for example unsettled raw domestic sewage, passes through the conduit 8 and into the rotating self-cleaning screen 10. Materials such as rags, matches, cinders and other materials that do not readily become disintegrated, i. e. finely divided, are separated from the liquid and usual organic solids which pass through the screen into the chamber 14 and directly though the conduit 15 to the distributer 16 without any further treatment. From this distributer they are applied to the top surface of the filter in any desired manner but preferably in accordance with the teachings of the above mentioned Halvorson et al. Patent No. 2,141,979, that is to say at a distribution ratio of less than 10 to 1. The sewage liquid with associated solids flows down the walls of the smooth, continuous and unobstructed passages extending from substantially the top to substantially the bottom of the filter, and into the under-drain 6 and collecting gutter 7 from whence it passes to the settling tank 18. After the plant has been operating for a time, bacterial flora forms on the walls of these conduits and effectively reduces the B. O. D. of the liquid as it passes through the filter. Actual tests of the process of the present invention have demonstrated that these conduits will not become clogged or stopped up in ordinary operation, notwithstanding the fact that the usual organic sewage solids are not settled out of the influent prior to its application to the filter in accordance with universal practice prior to the present invention. Due to the fact that the conduits are unobstructed and have smooth and continuous walls, there is no opportunity for collection of solid matter with consequent choking of the conduits, and moreover the conduits provide a generous supply of air at all times thereby favoring proper aerobic bacterial action. It is therefore highly preferable to use a filter of the Page type above referred to rather than a modification of this type in which the filter blocks are staggered, or an ordinary rock filter or other filter failing to provide smooth and unobstructed passageways, in treating unsettled raw organic sewage in accordance with the present invention.

In the settling tank 18 the solids compact at the bottom to form sludge in well-known manner, and clear liquid is drawn off from the upper portion of the settling tank through conduit 20 in a continuous stream to any point of discharge as a river or the like, while the plant is in operation. Periodically the sludge at the bottom of settling tank 18 is transferred to the sludge tank 24 by operation of pump 25. Preferably the sludge tank 24 is designed to be of such size as to receive one day's supply of sludge and the sludge is only removed from settling tank 18 and transferred to sludge tank 24 once a day. The materials contained in the incoming raw sewage that are not readily subject to disintegration such as matches, rags, and the like, do not pass through the filter but are continuously fed directly to sludge tank 24 through the conduit 34, it being noted that the self-cleaning screen above referred to is in continuous operation during the time that sewage is supplied to the filter. As is well known to those skilled in the art, the moisture content of the sludge removed from settling tank 18 and supplied to the sludge tank 24 may vary somewhat as, for example, from about 94% to 99% but will usually be about 98%. That is to say, the sludge delivered to tank 24 will usually contain about 2% of solids.

The sludge collected following passage of the unsettled raw sewage through the filter in accordance with the present invention may be disposed of in any desired way but an important feature of the invention resides in the provision of a novel process for treating this sludge, or undigested sludge produced by any other sewage treatment and de-watering it on a sand bed. Preferably this novel treatment is employed in stabilizing the sludge and rendering it fit for commercial use.

Raw, untreated sludge ordinarily cannot be successfully de-watered on a sand bed because when this is attempted, the sludge will not de-water readily but in its mixed solid and liquid state will putrify and give off offensive odors. The art of "conditioning" sludge, i. e. treating sludge chemically to cause the solids therein to lose their affinity for water so as to be in better condition for removal of at least the main bulk of the associated liquid, is well-known and a number of conditioning agents for this purpose have been proposed. Also it has heretofore been attempted to de-water raw, undigested sludge on sand beds following such conditioning but these efforts have also been unsuccessful. All conditioning agents now in wide commercial use, as for example a combination of ferric chloride, an acid salt, and lime, an alkali cause the solids in the sludge to drop to the bottom. Therefore, in cases where the de-watering of sludge conditioned by such agents on a sand bed has been attempted, the solids have dropped and compacted adjacent the upper surface of the sand bed, thereby preventing drainage of the liquid through the sand bed. Accordingly it has been proposed to dehydrate such conditioned sludge by a vacuum treatment in place of sand bed treatment and such practice is carried out in a number of plants at the present time. In these operations the moisture is drawn off by vacuum from the top and it is accordingly desirable that the solids in the sludge settle to the bottom as above stated where vacuum dehydration is used.

In contra-distinction to this previous practice, the present invention contemplates treating the sludge not merely to condition the same but also to cause generation of bubbles of gas therein for the purpose of supporting the solids, and dehydrating the sludge thus treated upon an ordinary sand bed or the like, while solids therein are supported and prevented from compacting on the upper surface of the sand bed by the small gas bubbles. Gas bubble generation is accomplished by adding a chemical agent which will react as a gas-forming agent with the sludge. In this way, the moisture can drain into the sand bed and it is possible to appreciably reduce the moisture content without the creation of objectionable odors, yet without vacuum treatment. Of course, the sludge may at the same time be subjected to sterilization for the purpose of killing bacteria contained therein, this not being essential to drainage of the sludge on a sand bed but desirable from a commercial and health point of view.

It has been found that various acid chemical agents when added to the undigested sludge will acidify the moisture in the sludge. Under such acid conditions the moisture will react with the natural carbonates present in the sludge solids to cause the carbonates to liberate carbon dioxide gas in the form of bubbles which will serve to support the sludge solids during de-watering and prevent the solids from compacting upon the surface upon which the sludge rests. The length of time that gas generation continues will vary with the amount of chemical agent added and the character of the sludge. Since the dewatering is a relatively slow process, requiring a matter of hours, and complete drying on the sand bed is not necessary to put the sludge in condition for use as fertilizer or for other purposes the presence of sludge moisture acidified by the chemical agent is assured as long as there exist carbonate solids still capable of generating carbon dioxide gas.

The conditioning of the sludge and the generation of gas theerin have separate but related purposes. The first renders the sludge capable of dewatering under favorable conditions during dewatering, and the second provides the favorable dewatering conditions. It has been found that various chemical agents will function in a dual capacity both as a conditioning agent and as a gas forming agent. Separate chemical agents for the two purposes may be employed. In the latter event the conditioning agent must be one capable of carrying out its conditioning function in the acid medium required to be developed by the gas forming agent. The chemical agent or agents added should not be unduly toxic to plant life and animals, so that the sludge may be used for commercial purposes after dehydration.

Ferric chloride, ferric sulphate, ferrous sulphate and ferrous chloride, for example, may be used as chemical agents in carrying out the present invention. These compounds have the dual ability of conditioning the sludge and effecting the generation of gas bubbles therein. Aluminum sulphate, aluminum chloride, zinc sulphate, and zinc chloride are examples of other sludge-treating chemical agents that may be used, although these compounds while adequate as conditioning agents are not as satisfactory as gas forming agents since they do not by themselves produce as much $CO_2$ as in the case of the group of compounds previously mentioned. But where using one of the latter groups of compounds, some acid such as sulphuric or hydrochloric acid may additionally be added to the sludge as a supplemental gas forming to increase the generation of $CO_2$.

These and other compounds will readily suggest themselves to those skilled in the art and the present invention is not limited to the use of any particular compounds, it being within the broad purview of the invention to treat the sludge by any chemical reagent or reagents which will condition the same and simultaneously produce gas in a manner to cause the solids in the sludge to be supported during dewatering, thereby preventing the solids from compacting and then dehydrating the sludge upon a sand bed or the like as the supporting surface by draining off the sludge liquid from the solids.

If it is desired to use a sterilizing agent, any such agent may be used which will not interfere with the proper bubbling action to form bubbles preventing undue compacting of the solids adjacent the upper surface of the sand bed. Particularly, care must be taken that the sterilizing agent used does not create so much acidity within the sludge as to cause a reaction so violent that the bubbles of gas produced will break away from the solids and permit them to compact at the bottom. Chlorine is an example of a sterilizing agent which, when used in amounts insuring sterilization has a tendency to over-acidify the sludge and cause too vigorous a reaction. Moreover, chlorine is not especially well suited because it is necessary to introduce this material rather too slowly.

It has been found that copper sulphate is well adapted for use as a sterilizing agent in the process of the present invention. Also any other well-known sterilizers within the limits mentioned above may be used, such as lead salts, cadmium salts or salts of the noble metals, etc.

In carrying out the process with the apparatus described above, the conditioning, gas-forming and sterilizing agents may be added directly to the sludge in the tank 24, or, if desired, a separate, enclosed, chemical treatment tank may be provided. Actual experience has shown that the addition of ferric chloride and copper sulphate to the sludge is well suited to the purposes of the present invention. The ferric chloride is principally used for its gas-forming and conditioning value although it also has some sterilizing value which, however, is insufficient to insure complete sterilization. The copper sulphate serves as the principal sterilizing agent. These reagents are relatively cheap and moreover may be used in amounts insuring proper sterility and conditioning, while also producing the proper bubbling action to provide for support of the solids so as to enable dewatering on an ordinary sand bed. Moreover, the amount used is not sufficient to result in the production of sludge toxic to plants or animals, but is rather beneficial to plants because these materials have been found to be important constituents in a well-balanced fertilizer.

As an example, ferric chloride and copper sulphate are added to sludge containing approximately 98% moisture in the tank 24, in the amount of from 0.12% to 0.2% or 1200 to 2000 parts of ferric chloride per million parts of sludge and 0.012% to 0.02% or 120 to 200 parts of copper sulphate per million parts of sludge. The sludge is thereupon stirred vigorously for a short time up to a few minutes as a maximum to thoroughly incorporate these reagents throughout the sludge before the sludge is applied to the sand bed, but the stirring is stopped as soon as the reagents are uniformly distributed through the sludge. It is desirable to have as little gas generation as possible until the sludge has been applied to the sand bed.

In practice, the sludge has been vigorously stirred for a period varying from a small fraction of a minute up to one or two minutes. Thereupon the sludge is promptly spread upon sand beds and when so spread, the particles of solid therein are supported by the gas bubbles, as above stated, so that drainage of liquid in the sludge to the sand bed may take place. The reaction between the reagents and the sludge is relatively gentle so that the bubbles will not break away from the solids and preclude their support during the dehydration.

It is highly desirable that the sludge be applied to the sand bed promptly after the rapid incorporation of the reagents therein. If it is allowed to stand too long before being applied to the sand bed, the generation of gas bubbles in the sludge may become substantial and such bubbles are likely to escape during pouring of the sludge on the sand bed. The generation of gas bubbles, accordingly, should take place after the sludge has reached the bed. When applied to the sand bed, the sludge is applied thereto in a manner similar to that in which digested sludge is customarily applied. It is spread in a layer of from 12 to 24 inches thick, preferably about 18 inches thick.

The amount of reagents stated above will, of course, vary with the particular type of sludge being dealt with as will be readily understood by those skilled in the art and the above figures are merely intended to be illustrative. For example, a variation in the amount of solids within the sludge would require a variation in the amount of reagents to produce the proper bubbling action.

Experience has shown the sludge treated with ferric chloride and copper sulphate and placed on a sand bed as above stated, de-waters sufficiently to have a moisture content of from 80% to 90% and to be treated as a wet cake in from six to eight hours. At this stage, the thickness of the layer has been reduced from 2 to 4 inches and the sludge may be handled by pitch forks or other suitable instruments and may be sold as fertilizer in this condition but if desired, the sludge may be further dried before disposal. Such further drying may take place by artificial heating or, where practical, the sludge may be further dried in the sun. By such further drying it is possible to reduce the moisture content of the sludge to around ten per cent whereupon it may be sold as a dry fertilizer.

It will thus be seen that the present process of treating sludge results in a simple and inexpensive process that may be carried out without obnoxious odors in the production of a sludge which possesses stability and sterility, and is not unduly toxic to plants and animals. Moreover, the sludge obtained by this treatment has a maximum amount of nitrogen contained therein for fertilizing value and the reagents used in the treatment of the sludge in themselves have fertilizing value.

In an ordinary sewage process wherein the sludge is treated in a digester, nitrogen is given off during the process of digestion in the form of ammonia which goes into solution with the sludge liquids in the digester and is carried off by such liquid. In practice, some of this liquid is removed periodically when any new sludge is supplied to the digester, and some is removed during the final drying of the sludge. Such liquid is ordinarily returned to the incoming raw sewage so as to be passed through the filter for purposes of oxidation and when this is done, the ammonia is oxidized to form nitrates which are carried out with the final effluent. These nitrates, which are produced in appreciable amounts in a plant for even a small municipality, are discharged into the stream or river receiving the final effluent. There they fertilize and stimulate undesirable growths in the river such as algae and the like. A process of treating sludge as described herein, eliminates such discharge of nitrates into the final effluent and thereby does not encourage growth of algae and other undesirable organisms, the prevention of which is one of the primary purposes of a sewage disposal plant.

Also it will be noted that the present process eliminates the necessity for both a primary settling tank and a final digester thereby greatly reducing the cost of installation necessary to effect proper sewage disposal. Moreover, the sand bed area required for the present process is smaller than the area required in an ordinary trickling filter plant in which the sludge is treated by digestion because the present process contemplates dehydration of the sludge every day. This further reduces the initial cost of the plant. Again, a plant required for carrying out the present invention requires a relatively small amount of space, and the lack of obnoxious odors makes it possible to build the plant near residential districts, or in city parks and the like as in the case of one municipality which is at the present time using the present process to treat its sewage.

While it is desirable to operate the filter in accordance with the teachings of the Halvorson et al. Patent No. 2,141,979, that is to say at low distribution ratios of less than ten to one and high daily average rates more than ten m. g. a. d. upwardly to thirty m. g. a. d., it is to be understood that the present invention may be followed in the case of plants utilizing other methods of application, if desired.

If desired the screening of the incoming raw sewage may be dispensed with and it may be subjected to a suitable comminutor or grinder to disintegrate any materials contained in the sewage that might clog the filter. The term "unsettled raw sewage" is used herein and in the claims to designate incoming raw sewage either with or without screening, or grinding or comminuting, but without any primary settling treatment for removable of settleable solids.

This application is a continuation of my prior application Serial No. 299,109, filed October 12, 1939, now abandoned.

I claim:

1. A process of treating sewage which comprises, passing unsettled raw sewage through a trickling filter open to atmosphere, collecting sludge from the effluent, and adding a member of the group of compounds consisting of ferric chloride, ferric sulphate, ferrous sulphate and ferrous chloride, to said undigested sludge and supporting said sludge upon a sand bed while solid particles therein are supported by bubbles generated in the reaction between the added compound and the sludge, thereby permitting liquid from the sludge to drain through the sand bed.

2. A process of treating organic sewage which comprises applying unsettled raw sewage to a trickling filter open to atmosphere and provided with a plurality of vertical conduits having substantially smooth continuous walls extending therethrough from the top to the bottom thereof, recovering the sludge from the filter effluent, delivering the undigested sludge on top of a sand bed for draining liquid therefrom through the bed, and levitating solid particles of the sludge against settling on the bed by generating particle-supporting bubbles of gas in the undigested sludge by reacting the sludge with a gas generating agent.

3. A process of treating undigested sludge which comprises reacting the sludge with a chemical conditioning and gas bubble producing agent, and supporting said sludge upon a sand bed in a layer for drainage of liquid from the sludge through the sand bed while the solid particles within the sludge are supported by said gas bubbles against settling.

4. A process of treating undigested sludge which comprises reacting the sludge with a conditioning and gas-forming material, stirring the sludge for a short time to incorporate said material therethrough, and then quickly spreading said sludge on a sand bed thereby to permit moisture to drain off therefrom while the gas formed in the sludge supports the solid particles therein against settling on the bed.

5. A process of treating undigested sludge which comprises reacting the sludge with a member of the group of compounds consisting of ferric chloride, ferric sulphate, ferrous sulphate and ferrous chloride, and supporting said sludge upon a sand bed while solid particles therein are supported against settling on the bed by bubbles generated in the reaction between the added compound and the sludge, thereby permitting liquid from the sludge to drain through the sand bed.

6. A process of treating undigested sludge which comprises reacting the sludge with ferric chloride, and supporting said sludge upon a sand bed while solid particles therein are supported against settling on the bed by bubbles generated in the reaction between the ferric chloride and the sludge, thereby permitting liquid from the sludge to drain through the sand bed.

7. A process of treating undigested sludge which comprises reacting the sludge with a member of the group consisting of ferric chloride, ferric sulphate, ferrous sulphate and ferrous chloride, vigorously stirring the sludge for less than substantially two minutes to incorporate the added compound therethrough, thereby to cause the compound to promote separation of the liquid in the sludge and generate gas forming bubbles therein adapted to support the solid sludge particles against settling during subsequent drainage of the liquid, and promptly spreading the thus treated sludge upon a sand bed to permit liquid therefrom to drain through the bed.

8. A process of treating undigested sludge which comprises reacting the sludge with a chemical sterilizing agent of such acidity and in such quantity as will only mildly acidify the sludge and also with a gas forming chemical agent reacting with the undigested sludge to produce gas bubbles for supporting particles of solid within the sludge, and supporting said sludge upon a sand bed for drainage of liquid therefrom through said bed while the solid particles in the sludge are suspended against settling by said bubbles.

9. A process of treating undigested sludge which comprises reacting the sludge with a mixture of ferric chloride and copper sulphate, and then promptly spreading the sludge upon a sand bed.

10. The process of treating undigested sludge having a moisture content of the order of 98%, which comprises adding ferric chloride thereto in the amount of substantially from 1200 to 2000 parts of ferric chloride per million parts of sludge, briefly stirring the sludge and ferric chloride and then promptly spreading said sludge upon a sand bed to permit the liquid to drain therefrom.

11. A process as claimed in claim 10 wherein 120 to 200 parts of copper sulphate are also added to the sludge before stirring.

H. ORIN HALVORSON.

REFERENCES CITED

The following references are of record in the file of this patent:

UNITED STATES PATENTS

| Number | Name | Date |
|---|---|---|
| 580,793 | Mitchell | Apr. 13, 1897 |
| 825,637 | Brown | July 10, 1906 |
| 1,056,548 | Imhoff | Mar. 18, 1913 |
| 1,083,833 | Irwin | Jan. 6, 1914 |
| 1,430,182 | Peck | Sept. 26, 1922 |
| 1,672,587 | Travers | June 5, 1928 |
| 1,797,879 | Rudolfs | Mar. 24, 1931 |
| 1,847,080 | Buswell | Mar. 1, 1932 |
| 1,876,123 | Wright | Sept. 6, 1932 |
| 1,877,623 | Laughlin | Sept. 13, 1932 |
| 1,892,681 | Rankin | Jan. 3, 1933 |
| 1,915,240 | Putnam | June 20, 1933 |
| 2,008,507 | Laughlin | July 16, 1935 |
| 2,084,659 | Streander | June 22, 1937 |
| 2,141,979 | Halvorson et al. | Dec. 27, 1938 |
| 2,142,196 | Langdon | Jan. 3, 1939 |
| 2,168,208 | Jenks | Aug. 1, 1939 |
| 2,183,657 | Page | Dec. 19, 1939 |
| 2,188,162 | Schulhoff | Jan. 23, 1940 |

FOREIGN PATENTS

| Number | Country | Date |
|---|---|---|
| 22,864 of 1909 | Great Britain | July 7, 1910 |

OTHER REFERENCES

"American Sewerage Practice," Metcalf and Eddy and Eddy, vol. III, (1935), pp. 715–717, 739, 741–744.

"Sewage Disposal," Kinnicutt, Winslow and Pratt, (1919), pp. 332, 376, 416.

"Investigations on the Purification of Boston Sewage," Winslow and Phelps, "Journal of Infectious Diseases," vol, VIII, No. 3, (April 1911), pp. 259–272.

"Solving Sewage Problems," Fuller and McClintock, (1926), first edition, page 337.

"Chemistry of Water and Sewage Treatment," Buswell, (1928), page 327.

"Sewerage and Sewage Treatment," Babbitt, (1925), p. 490–492.